United States Patent
Bae

[11] Patent Number: 6,098,025
[45] Date of Patent: Aug. 1, 2000

[54] APPARATUS AND METHOD FOR CALIBRATING MOMENT-OF-INERTIA AND CENTER-OF-GRAVITY

[75] Inventor: Sang-Sin Bae, Kyonggi-do, Rep. of Korea

[73] Assignee: SamSung Electronics Co., Ltd., Suwon, Rep. of Korea

[21] Appl. No.: 09/140,390

[22] Filed: Aug. 26, 1998

[30] Foreign Application Priority Data

Feb. 18, 1998 [KR] Rep. of Korea ......................... 98-5025

[51] Int. Cl.[7] .................................................. G01M 1/00
[52] U.S. Cl. ........................... 702/94; 73/65.01; 33/398; 702/169
[58] Field of Search ............................... 702/94, 96, 169; 33/398; 73/65.01, 65.08; 701/124; 324/173, 174

[56] References Cited

U.S. PATENT DOCUMENTS

| | | |
|---|---|---|
| 4,097,787 | 6/1978 | Larsson et al. ........................ 318/332 |
| 4,319,188 | 3/1982 | Ito et al. . |
| 4,350,852 | 9/1982 | Neyret . |
| 4,890,059 | 12/1989 | Guentner . |
| 5,018,382 | 5/1991 | Kelley et al. .............................. 73/65 |
| 5,081,865 | 1/1992 | Schechter et al. . |
| 5,177,998 | 1/1993 | Monk . |
| 5,293,125 | 3/1994 | Griffen et al. . |
| 5,349,438 | 9/1994 | Solomon . |
| 5,367,909 | 11/1994 | Heilman et al. . |
| 5,537,272 | 7/1996 | Kazmierczak et al. . |
| 5,559,728 | 9/1996 | Kowalski et al. . |
| 5,656,768 | 8/1997 | Abler et al. . |
| 5,858,142 | 1/1999 | Tully et al. ............................ 156/73.5 |

OTHER PUBLICATIONS

"American Institute of Physics Handbook," (New York: McGraw–Hill, Inc., 1982), pp. 2–8, & 3–166 to 3–167, Dec. 1982.

Kurtz, Max, "Handbook of Applied Mathematics for Engineers and Scientists," (New York: McGraw–Hill, Inc., 1991), pp. 12–68 to 12–69, Dec. 1991.

*Primary Examiner*—Patrick Assouad
*Attorney, Agent, or Firm*—Robert E. Bushnell, Esq.

[57] ABSTRACT

An apparatus and a related method are used to simultaneously calibrate a center-of-gravity and a moment-of-inertia. The apparatus includes: a motor rotated with a prescribed velocity; a tachometer installed at the motor for calibrating an angular velocity of the moto; a fixed plate which is installed at the upper portion of rotation axis of the motor and has a plurality of parts fixing units; a motor driver connected to the motor for controlling the driving of the motor and for calibrating a current value flowing into the motor; and a processor connected to the motor driver and the tachometer for calculating a center-of-gravity and a moment-of-inertia of a part by using the calibrated angular velocity and current value.

22 Claims, 5 Drawing Sheets

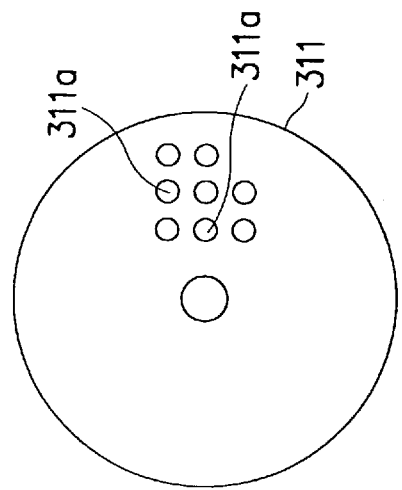
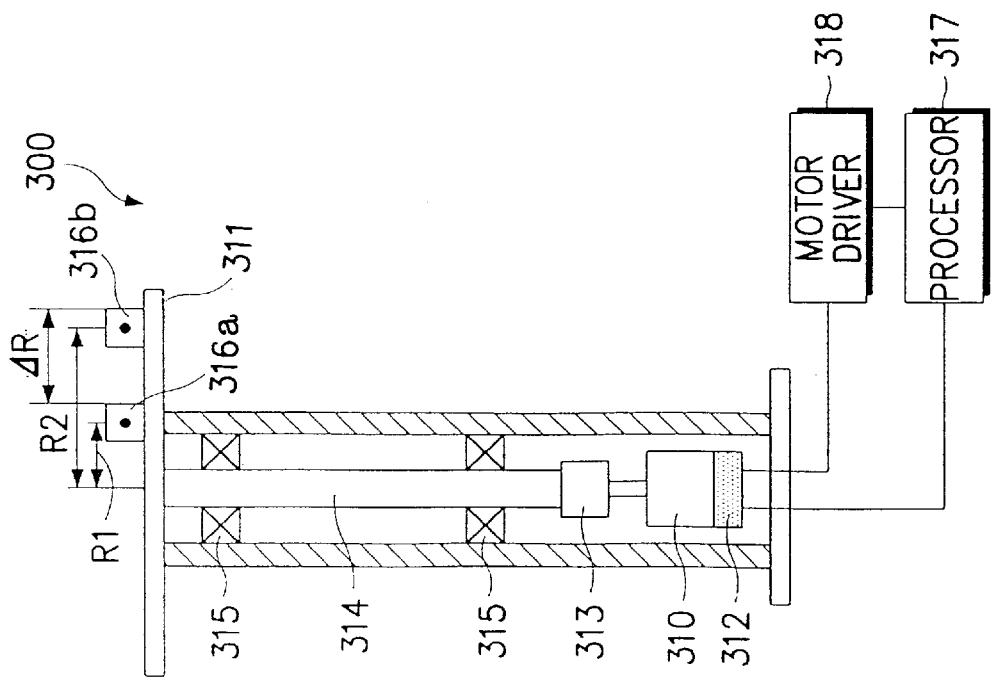
FIG. 4B
FIG. 4A

APPARATUS AND METHOD FOR CALIBRATING MOMENT-OF-INERTIA AND CENTER-OF-GRAVITY

BACKGROUND OF THE INVENTION

1. Technical Field

The present invention generally relates to physical values of mechanical parts and, more particularly, to an apparatus and method for simultaneously calibrating a moment-of-inertia and a center-of-gravity.

2. Related Art

Generally, since a machine moves dynamically, a center-of-gravity and a moment-of-inertia of each of parts constituting the machine should be individually calibrated. Assuming that there is a rotor whose center-of-gravity and moment-of-inertia are wrongly calibrated, inertia force generated when the rotor slightly loses its balance creates a force several times larger than the weight of the rotor, thereby degrading the entire performance of the machine. Therefore, it is very important to accurately and easily calibrate a center-of-gravity and a moment-of-inertia of specific parts constituting the machine.

In the prior art, there exist methods and apparatuses which calibrate a center-of-gravity or a moment-of-inertia of specific parts constituting a machine which moves dynamically. For example, such methods and/or apparatuses are disclosed in the following patents: U.S. Pat. No. 4,319,188 to Ito et al., entitled Magnetic Rotary Encoder For Detection Of Incremental Angular Displacement, U.S. Pat. No. 4,350,852 to Neyret, entitled Bi-Stable Mechanism And Anti-Theft Device For A Motor Vehicle Comprising Such Mechanism, U.S. Pat. No. 4,890,059 to Guentner, entitled Digital Tachometer With Air Gap Adjusting Yoke Insertable Through Holes In The Tachometer Housing, U.S. Pat. No. 5,081,865 to Schechter et al., entitled Center Of Gravity Locating Method, U.S. Pat. No. 5,177,998 to Monk, entitled Center Of Gravity And Moments Of Inertia Measurement Device, U.S. Pat. No. 5,293,125 to Griffen et al., entitled Self-Aligning Tachometer With Interchangeable Elements For Different Resolution Outputs, U.S. Pat. No. 5,349,438 to Solomon, entitled Structure For The Dynamic Support Of A Reflective Element And Interferometer Comprising the Same, U.S. Pat. No. 5,367,909 to Heilman et al., entitled Test Weight, U.S. Pat. No. 5,537,272 to Kazmierczak et al., entitled Spindle Balance Device For A Hard Disk Drive Assembly, U.S. Pat. No. 5,559,728 to Kowalski et al., entitled Calibration Transfer For Second Order Analytical Instruments, and U.S. Pat. No. 5,656,768 to Abler et al., entitled Method For Determining The Moment Of Inertia.

The problem with such methods and apparatuses of the prior art resides in the fact that such methods and apparatuses typically calibrate only the moment-of-inertia or the center-of-gravity. Furthermore, typical methods and/or apparatuses for calibrating the center-of-gravity calibrate that quantity only for an object having a gimbal structure.

Referring to the above-identified patents, by way of example, Abler et al. '768 discloses method for determining the moment-of-inertia only, and such method is directed to determination of the moment-of-inertia for an internal combustion engine in particular. Moreover, Monk '998 discloses a device for calculating the center-of-gravity and moment-of-inertia, but such device is directed to calculation of those quantities for vehicle only. Finally, Schechter et al. 865 discloses a method and system for determining the center-of-gravity of a body, but such system and method do not provide for the determination of a moment-of-inertia.

Therefore, there is a need in the prior art for the development of a method and apparatus for simultaneously calibrating both the moment-of-inertia and the center-of-gravity. Moreover, there is a need for the development of a method and apparatus for easily calibrating a moment-of-inertia and a center-of-gravity for an object having a complicated shape, as opposed to an object having a defined structure (such as a gimbal structure). Finally, there is a need for the development of a method and apparatus for easily calibrating a moment-of-inertia and a center-of-gravity for a as movable part mounted in a multi-axis rotation system.

SUMMARY OF THE INVENTION

It is, therefore, an object of the present invention to provide an apparatus and method for simultaneously calibrating a moment-of-inertia and a center-of-gravity.

It is another object of the present invention to provide an apparatus and method for easily calibrating a moment-of-inertia and a center-of-gravity of an object HAVING a complicated shape.

It is still another object of the present invention to provide an apparatus and method for easily calibrating a moment-of-inertia and a center-of-gravity of a movable part mounted in a multi-axis rotation system.

According to one aspect of the present invention, an apparatus for simultaneously calibrating a center-of-gravity and a moment-of-inertia of a part includes: a motor rotated with prescribed velocity; a tachometer installed on the motor for calibrating angular velocity of the motor; a fixed plate which is installed at the upper portion of rotation axis of the motor and has a plurality of parts fixing units; a motor driver connected to the motor, for controlling the driving of the motor and calibrating a current value flowing into the motor; and a processor connected to the motor driver and the tachometer for calculating a center-of-gravity and a moment-of-inertia of a part by using the calibrated angular velocity and current value.

According to another aspect of the present invention, a method for calibrating a center-of-gravity and a moment-of-inertia of a part includes the steps of: fixing a part at a certain position on a fixed plate and rotating the fixed plate by a motor for a given time; calibrating an angular velocity value by a tachometer, calibrating a current value applied to the motor, and stopping the motor by a motor driver; calculating an angular acceleration value and a motor torque value by using the angular velocity value and the current value; calculating a first moment-of-inertia value of the part by using the angular acceleration value and the motor torque value; calculating a second moment-of-inertia value of the part by repeating the above steps with respect to the part fixed at another position on the fixed plate; and calculating a center-of-gravity of the part and a moment-of-inertia at the center-of-gravity by using the first and second moment-of-inertia values.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4A shows an apparatus for calibrating a moment-of-inertia and a center-of-gravity according to the present invention;

FIG. 4B is a top view of the fixed plate of the apparatus fo FIG. 4A; and

DETAILED DESCRIPTION OF THE PREFERRED EMBODIMENT

In the following description, well known functions or constructions have not been described so as not to obscure the present invention.

Figure 1A:
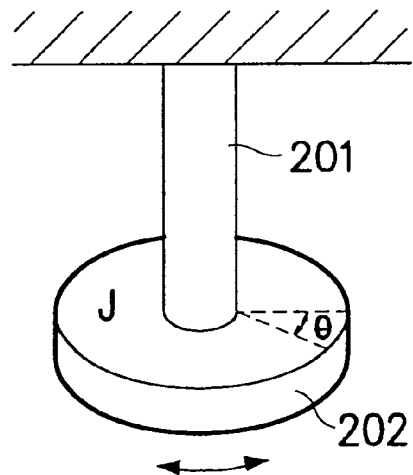
FIG. 1A shows a general rotation system for calibrating a moment-of-gravity.
Figure 1B:
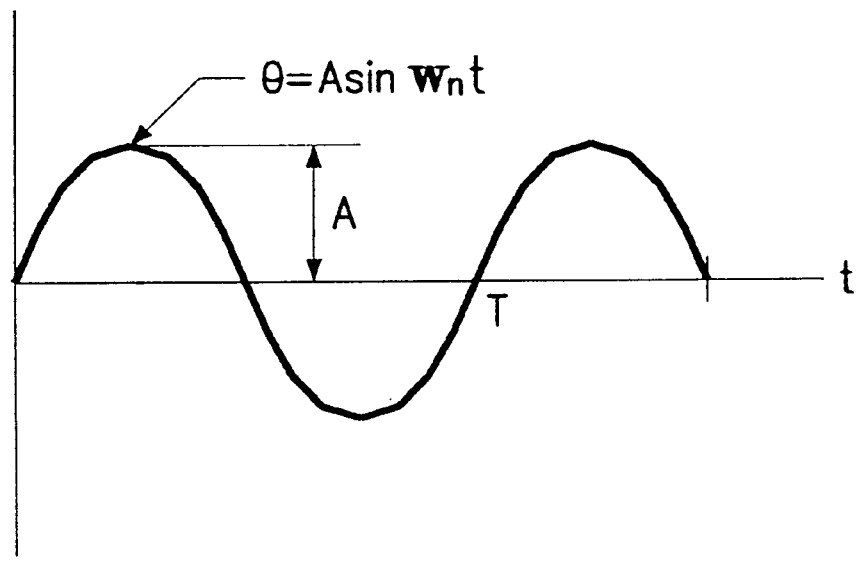
FIG. 1B is a graph showing simple harmonic motion of the system of FIG. 1A.

FIG. 1A shows a general rotation system for calibrating a moment-of-inertia, and FIG. 1B is a graph indicating simple harmonic motion of the system of FIG. 1A.

The moment-of-inertia can be obtained by rotating an object 202 fixed at the bottom of a torsion spring 201. As shown in FIG. 1A, if the object 202 is rotated by an angle θ, then $$\frac{d^2\theta}{dt^2} + \frac{k}{J}\theta = 0 \tag{1}$$

where k is a spring constant, and J is a moment-of-inertia of an object. The solution of the secondorder differential equation of equation (1) is given by:

$$\theta = c_1 \cos\sqrt{\frac{k}{J}}\, t + c_2 \sin\sqrt{\frac{k}{J}}\, t \tag{2}$$

where $c_1$ and $c_2$ are constants determined by boundary conditions. Assuming that θ=0 when t=0 and θ=A when $$\left(\sqrt{\frac{k}{J}}\right) t = \frac{\pi}{2},$$

then, $c_1=0$ and $c_2=A$. Therefore, equation (2) can be represented by:

$$\theta = A \sin\sqrt{\frac{k}{J}}\, t \tag{3}$$

From equation (3) and FIG. 1B, we get $$\omega_n = \sqrt{\frac{k}{J}} \tag{4}$$

where $\omega_n$ (radian/sec) is the natural frequency of a torsion pendulum. Hence, the relationship between a natural frequency of the object and a period of the object is given by:

$$f_n = \frac{1}{2\pi}\omega_n = \frac{1}{2\pi}\sqrt{\frac{k}{J}} = \frac{1}{T} \tag{5}$$

where $f_n$ (cycle/sec) is the unique frequency of the object, and T is the period of the object. If equation (5) is defined for the moment-of-inertia J, then $$J = \frac{1}{4\pi^2}kT^2 = CT^2 \tag{6}$$

where C is a calibration constant.

Figure 2:
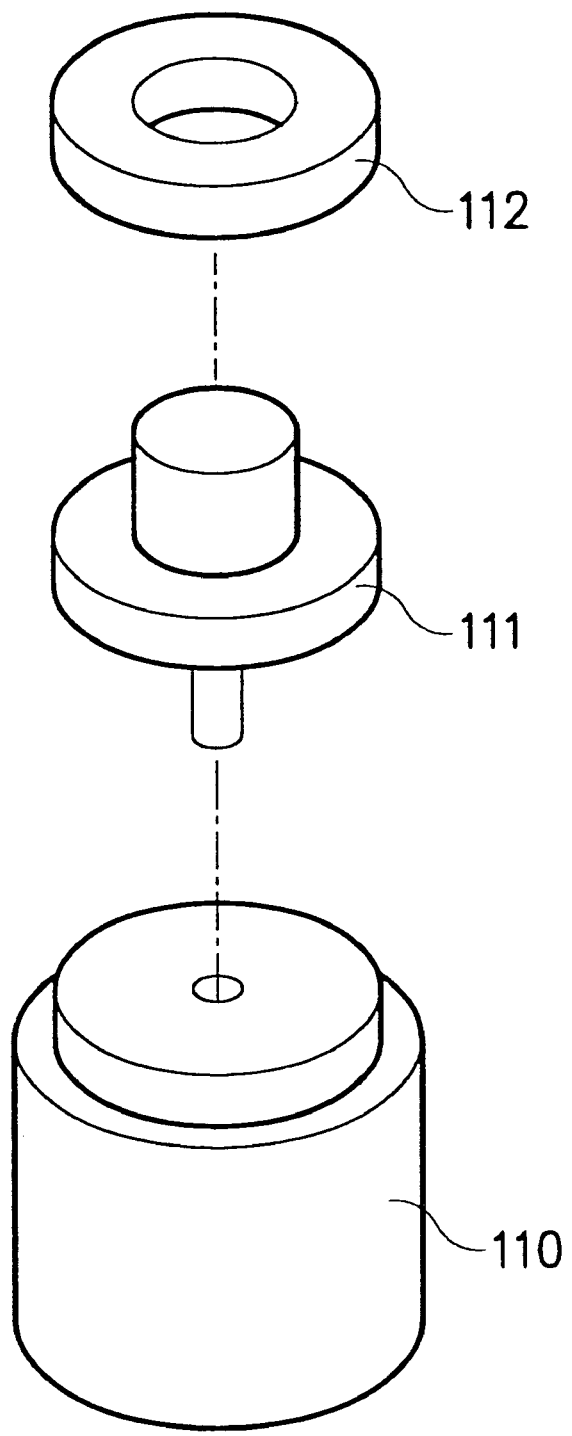
FIG. 2 is a perspective view of an apparatus for calibrating a moment-of-inertia.

FIG. 2 is a perspective view of an apparatus for calibrating a moment-of-inertia. The apparatus of FIG. 2 is comprised of a spring mass described with reference to FIGs. 1A and 1B. The apparatus has a fixture 111 for fixing a part 112, and a calibration instrument 110 for mounting and rotating the fixture 111 to which the part 112 is fixed. The moment-of-inertia of the part 112 is expressed as a function of a value obtained by subtracting the rotation period of the fixture 111 and the instrument 110, calibrated when the part 112 is not mounted on them, from the rotation period calibrated when the part 112 is put on the instrument 110 by the fixture 111. That is:

$$J_c = C(T_x^2 - T_0^2) \tag{7}$$

where $J_c$ is the moment-of-inertial of the part 112, $T_x$ is the period calibrated when the part 112 is mounted on the instrument 110 by means of the fixture 111, $T_0$ is the period of the instrument 110 and the fixture 111, and C is a calibration constant.

Figure 3:
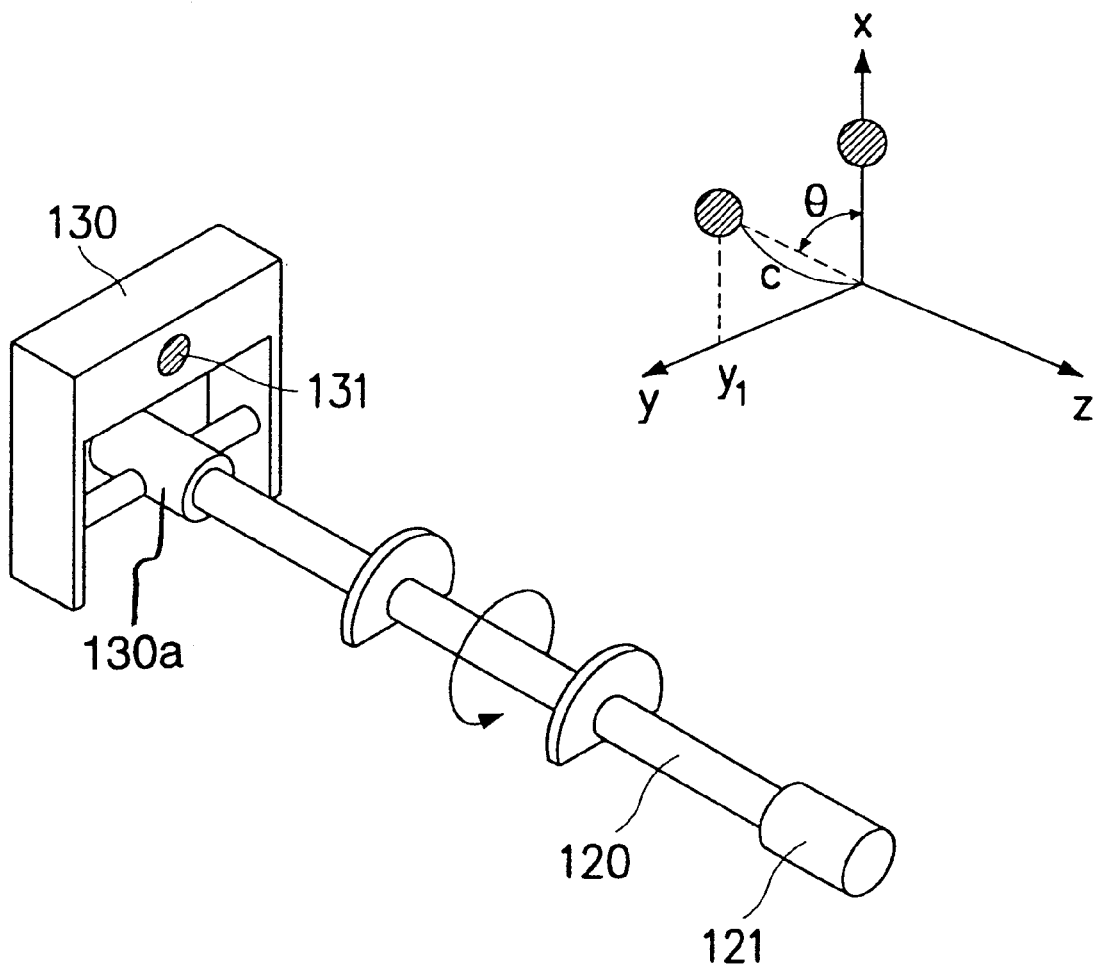
FIG. 3 is a perspective view of an apparatus for calibrating a center-of-gravity.

FIG. 3 is a perspective view of an apparatus for calibrating a center-of-gravity. An object 130 having a gimbal structure 130a is fixed to a calibration instrument 120. A center-of-gravity 131 of the object 130 is separated from the center of the instrument 120 by any distance. A torque sensor 121 for obtaining a torque value of the object 130 is installed on the instrument 120.

A torque T of the object 130 rotated by an angle θ is given by:

$$T = Mgy_1 \tag{8}$$

where M is the mass of the object 130, g is acceleration-of-gravity, and $y_1$ is a distance on y-axis of the center-of-gravity of the object 130. The torque T, mass M and acceleration-of-gravity g are known values, and therefore, the distance $y_1$ on y-axis of the center-of-gravity 131 can be obtained. A distance C from the center of the instrument 120 to the center-of-gravity 131 of the object 130 is represented by:

$$C = \frac{y_1}{\sin \theta} \tag{9}$$

where C is a distance from the center of the instrument 120 to the center-of-gravity 131 of the object 130, and θ is an angle of the object 130 rotated by the instrument 120.

However, the above calibration apparatus is limited in its use. Moreover, the moment-of-inertia and the center-of-gravity is calibrated by different apparatuses. Furthermore, since the apparatus for calibrating the center-of-gravity calibrates the center-of-gravity of only the object having a gimbal structure, additional calibration apparatuses should be provided according to the types of objects.

Referring to FIGS. 4A and 4B, an apparatus 300 for calibrating a moment-of-inertia and a center-of-gravity according to the present invention includes a driving motor 310 and a fixed plate 311 rotated by the driving motor 310. A tachometer 312 for calibrating angular velocity during the rotation of the driving motor 310 is installed at the bottom of the driving motor 310. A shaft 314 is fixed to the driving motor 310 by a coupling 313, and rotates the fixed plate 311. A plurality of bearings 315 is installed on the shaft 314 to aid the rotation of the fixed plate 311. A plurality of parts fixing units 311a is installed on one side of the center of the fixed plate 311 at regular intervals. A motor driver 318 connected to the motor 310 controls the dynamic force of the motor 310. A processor 317 calculates the moment-of-inertia and the center-of-gravity of the part fixed on the fixed plate 311 at positions 316a, 316b.

The user fixes a part at different positions on the fixed plate 311 and rotates the fixed plate 311 for a given time at each position of the part. The processor 317 calculates the moment-of-inertia and the center-of-gravity of the part at positions 316a, 316b and causes a display unit (not shown) to display the calculated values.

Figure 5:
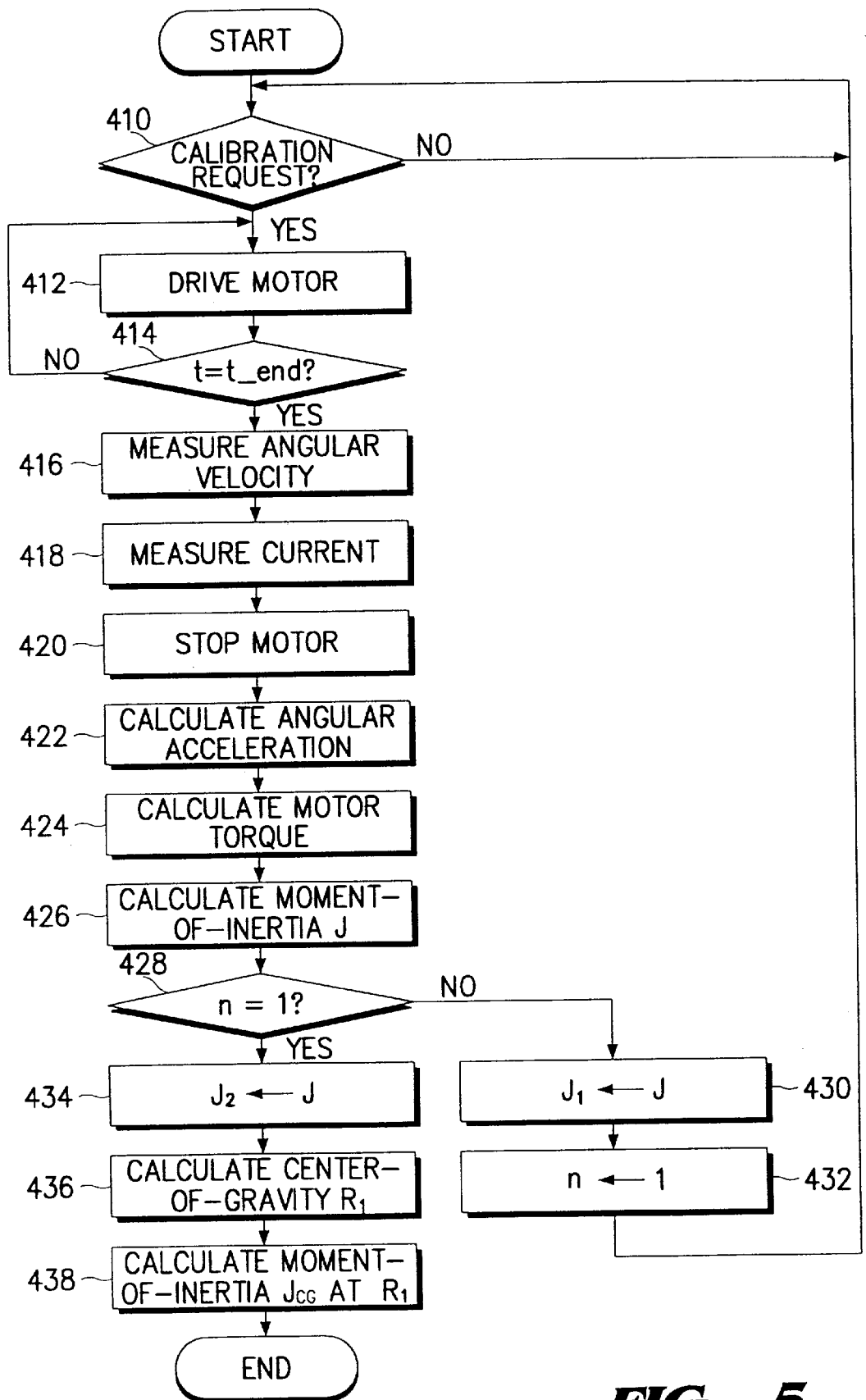
FIG. 5 is a flow chart of a control process for calibrating a moment-of-inertia and a center-of-gravity according to the present invention.

The control process for calculating the moment-of-inertia and the center-of-gravity is illustrated in FIG. 5. If there is a calibration request at step 410, the processor 317 drives the motor 310 through the motor driver 318 at step 412. The motor 310 is driven for a predetermined time t_end. If the predetermined time t_end elapses at step 414, an angular velocity ω is measured by the tachometer 312 at step 416, and a current value i applied to the motor 310 is measured at step 418. The motor 310 is stopped by the motor driver 318 at step 420.

The processor 317 calculates an angular acceleration a by using the angular velocity at step 422. The angular acceleration a of the motor 310 is given by:

$$a = \frac{\Delta \omega}{\Delta t} = \frac{\omega}{t} \quad (10)$$

where Δω is the displacement amount of the angular velocity, and Δt is the amount of time of displacement.

The processor 317 calculates the motor torque T by using the current value i at step 424. The motor torque T is given by:

$$T = K_t i \quad (1)$$

where $K_t$ is a motor torque constant, and i is the current value applied to the motor 310.

The processor 317 calculates a moment-of-inertia J at a fixed position of a part by using the angular acceleration a and the motor torque T at step 426. The moment-of-inertia J at a fixed position of the part is given by:

$$J = \frac{T}{a} \quad (12)$$

where T is the motor torque, and a is the angular acceleration of the motor 310.

The processor 317 checks whether a position parameter n is 1 at step 428. If it is not 1, the moment-of-inertia J is set to a moment-of-inertia $J_1$ at a first fixed position at step 430, and the position parameter n is set to 1 at step 432. Step 432 then returns to step 410 to calculate the moment-of-inertia at another position.

If the position parameter n is 1, the moment-of-inertia J is set to a moment-of-inertia $J_2$ at a second fixed position at step 434. A center-of-gravity $R_1$ is calculated at step 436. A moment-of-inertia $J_{CG}$ at the center-of-gravity is calculated at step 438. In more detail, the moment-of-inertia $J_1$ at the first fixed position on the fixed plate 311 and the moment-of-inertia $J_2$ at the second fixed position on the fixed plate 311 can be represented by parallel-axis theorem as follows:

$$J_1 = J_{CG} + MR_1^2 \quad (13)$$

where $J_{CG}$ (unknown value) is a moment-of-inertia at the center-of-gravity of the part, M is the mass of the part, and $R_1$ (unknown value) is a distance from the shaft 314 to the center-of-gravity of the part 316a, and $$J_2 = J_{CG} + MR_2^2 \quad (14)$$

where $R_2$ (unknown value) is a distance from the shaft 314 to the center-of-gravity of the part 316b.

Since $R_2$ of equation (14) is a distance shifted by a given distance ΔR (known value) from the distance $R_1$, the moment-of-inertia $J_2$ at the second fixed position can be represented by:

$$J_2 = J_{CG} + M(\Delta R + R_1)^2 \quad (15)$$

where ΔR is a distance between the first fixed position $R_1$ and the second fixed position $R_2$. If the moment-of-gravity $J_{CG}$ is eliminated from equations (13) and (15), then $R_1$ is given by:

$$R_1 = \frac{1}{2}\left(\frac{J_2 - J_1}{M\Delta R} - \Delta R\right) \quad (16)$$

Therefore, the processor 317 can calculate the distance $R_1$ from the rotation axis to the center-of-gravity of the part 316a. When substituting the center-of-gravity $R_1$ of equation (16) for $R_1$ in equation (13), the moment-of-inertia $J_{CG}$ at the center-of-gravity of the part 316b can be calculated. That is, the processor 137 simultaneously calculates the center-of-gravity and the moment-of-inertia by using equations (16) and (13) and generates them through the display unit.

As described above, the moment-of-inertia and the center-of-gravity of parts can be simultaneously calibrated by using one apparatus. Moreover, the moment-of-inertia and the center-of-gravity of parts with a complicated shape and of a movable part mounted in a multi-axis rotation system can be easily calculated.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for simultaneously calibrating a center-of-gravity and a moment-of-inertia of a part, comprising:

a motor rotated with a prescribed velocity;

a tachometer installed at said motor for calibrating an angular velocity of said motor;

a fixed plate installed at an upper portion of a rotation axis of said motor and having a plurality of parts fixing units;

a motor driver connected to said motor for controlling driving of said motor and for calibrating a value of current flowing into said motor; and a processor connected to said motor driver and to said tachometer for calculating a center-of-gravity and a moment-of-inertia of the part by using the calibrated angular velocity and the calibrated value of current flowing into said motor.

2. The apparatus as claimed in claim 1, further comprising a shaft and a plurality of bearings connected between said motor and said fixed plate by a coupling.

3. A method for simultaneously calibrating a center-of-gravity and a moment-of-inertia of a part, comprising the steps of:

fixing said part at a certain position on a fixed plate;

rotating said fixed plate by a motor;

calibrating an angular velocity value by a tachometer;

calibrating a value of current applied to said motor;

calculating an angular acceleration value and a motor torque value by using said calibrated angular velocity value and said calibrated value of current applied to said motor;

calculating a first moment-of-inertia value of said part by using said calculated angular acceleration value and said calculated motor torque value;

calculating a second moment-of-inertia value of said part by repeating the above steps with respect to said part fixed at another position on said fixed plate; and calculating a center-of-gravity of said part and a moment-of-inertia at said center-of-gravity by using said first and second moment-of-inertia values.

4. The method as claimed in claim 3, wherein said angular acceleration value and said motor torque value are obtained by:

$$a = \frac{\Delta \omega}{\Delta t} = \frac{\omega}{t}$$

where a is the angular acceleration value of said motor, $\Delta\omega$ is a displacement amount of angular velocity, and $\Delta t$ is a displacement amount of time, and $$T = K_t i$$

where T is the motor torque value, $K_t$ is a motor torque constant, and i is the value of the current applied to said motor.

5. The method as claimed in claim 4, wherein said first and second moment-of-inertia values are calculated by:

$$J_1 = \frac{T_1}{a_1} = J_{CG} + MR_1^2$$

where $J_1$ is the first moment-of-inertia value at a first fixed position, $J_{CG}$ is the moment-of-inertia at the center-of-gravity, M is the mass of said part, and $R_1$ is a distance from a shaft of said motor to the center-of-gravity of said part, and $$J_2 = \frac{T_2}{a_2} = J_{CG} + MR_2^2 = J_{CG} + M(\Delta R + R_1)^2$$

where $J_2$ is the second moment-of-inertia value at a second fixed position, $R_2$ is a distance from the shaft to the center-of-gravity, and $\Delta R$ is a distance between $R_1$ and $R_2$.

6. The method as claimed in claim 5, wherein said distance $R_1$ from the shaft of said motor to the center-of-gravity of said part and said moment-of-inertia $J_{CG}$ at said center-of-gravity are calculated by:

$$R_1 = \frac{1}{2}\left(\frac{J_2 - J_1}{M \Delta R} - \Delta R\right)$$

and $$J_{CG} = J_1 - MR_1^2.$$

7. The method as claimed in claim 3, further comprising the steps, after the fixing step, of:

determining whether a calibration request is received; and when a calibration request is received, performing the rotating step.

8. The method as claimed in claim 3, further comprising the steps, after the step of calibrating the value of current applied to said motor, of:

determining whether a predetermined time of rotation has elapsed; and when the predetermined time of rotation has elapsed, stopping rotation of said fixed plate by said motor.

9. An apparatus for simultaneously calibrating a center-of-gravity and a moment-of-inertia of a part, comprising:

plate means for holding said part at a first position and at a second position;

driver means connected to said plate means for rotating said fixed plate about an axis of rotation, said part being fixed to said plate means at said first position during a first rotation, and at said second position during a second rotation, said first and second position being separated from said axis of rotation by respective different distances;

tachometer means connected to said driver means for calibrating an angular velocity of said driver means; and processor means connected to said driver means and to said tachometer means for calculating said center-of-gravity and said moment-of-inertia of said part by using the angular velocity of said driver means as calibrating by said tachometer means to calculate first and second moments of inertia for said first and second rotations, respectively.

10. The apparatus as claimed in claim 9, wherein said driver means comprises a motor rotated at a predetermined velocity, and a motor driver connected to said motor for controlling driving of said motor and for calibrating a value of current flowing into said motor; and wherein said processor means calculates the center-of-gravity and the moment-of-inertia of the part by using the calibrated value of current flowing into said motor.

11. The apparatus as claimed in claim 9, further comprising a shaft connecting said driver means to said plate means.

12. The apparatus as claimed in claim 11, further comprising coupling means for coupling said shaft to said driver means.

13. The apparatus as claimed in claim 9, wherein said plate means comprises a fixed plate installed at an upper portion of said axis of rotation of said driver means.

14. The apparatus as claimed in claim 9, further comprising a plurality of parts fixing UNITS, one for each of said first and second positions, disposed on said plate means, each of said parts fixing units mounting said part on said plate means.

15. A method for simultaneously calibrating a center-of-gravity and a moment-of-inertia of a part, comprising the steps of:

providing a fixed plate which is rotatable about an axis of rotation;

mounting said part at a first position on said fixed plate, said first position being displaced by a first distance from said axis of rotation;

rotating said fixed plate;

calculating a first moment-of-inertia for said part at said first position on said fixed plate;

stopping rotation of said fixed plate;

mounting said part at a second position on said fixed plate, said second position being displaced from said axis of rotation by a second distance different from said first distance;

calculating a second moment-of-inertia for said part at said second position on said first plate; and calculating a center-of-gravity of said part and a moment-of-inertia at said center-of-gravity by using said first and second moment-of-inertia values.

16. The method as claimed in claim 15, further comprising the steps, prior to said rotating step, of:

determining whether a calibration request is received; and when a calibration request is received, performing said rotating step.

17. The method as claimed in claim 15, further comprising the steps, prior to said calculating steps, of:

calculating at least one of an angular acceleration value and a torque value; and using said calculated angular acceleration value and said calculated torque value in said calculating steps to calculate said first and second moment-of-inertia values.

18. The method as claimed in claim 17, further comprising the steps, prior to said step of calculating at least one of said angular acceleration value and said torque value, of:

calibrating at least one of an angular velocity value and a value of current associated with said rotation of said fixed plate; and using said calibrated angular velocity value and said calibrated value of current associated with rotation of said fixed plate in said step of calculating at least one of said angular acceleration value and said torque value.

19. The method as claimed in claim 18, wherein said angular acceleration value and said torque value are obtained by:

$$a = \frac{\Delta \omega}{\Delta t} = \frac{\omega}{t}$$

where a is the angular acceleration value of said motor, $\Delta\omega$ is a displacement amount of angular velocity, and $\Delta t$ is a displacement amount of time, and T=$K_t i$ where T is the torque value, $K_t$ is a torque constant, and i is the value of the current associated with said rotation.

20. The method as claimed in claim 15, wherein said first and second moment-of-inertia values are calculated by:

$$J_1 = \frac{T_1}{a_1} = J_{CG} + MR_1^2$$

where $J_1$ is the first moment-of-inertia value at the first position, $J_{CG}$ is the moment-of-inertia at the center-of-gravity, M is the mass of said part, and $R_1$ is a distance from an axis of rotation to the center-of-gravity of said part, and $$J_2 = \frac{T_2}{a_2} = J_{CG} + MR_2^2 = J_{CG} + M(\Delta R + R_1)^2$$

where $J_2$ is the second moment-of-inertia value at the second position, $R_2$ is a distance from the axis of rotation to the center-of-gravity, and $\Delta R$ is a distance between $R_1$ and $R_2$.

21. The method as claimed in claim 20, wherein said distance $R_1$ from the axis of rotation to the center-of-gravity of said part and said moment-of-inertia $J_{CG}$ at said center-of-gravity are calculated by:

$$R_1 = \frac{1}{2}\left(\frac{J_2 - J_1}{M\Delta R} - \Delta R\right)$$

and $$J_{CG} = J_1 - MR_1^2.$$

22. The apparatus as claimed in claim 1, wherein said part is mounted at a first position on said fixed plate by using a first one of said parts fixing units, and said fixed plate is rotated by said motor for a first period of time, during which said processor calculates a first moment-of-inertia;

wherein said part is mounted at a second position on said fixed plate by using a second one of said parts fixing units, and said fixed plate is rotated by said motor for a second period of time, during which said processor calculates a second moment-of-inertia; and wherein said processor uses said first and second moment-of-inertia to calculate said center-of-gravity and said moment-of-inertia of said part.

* * * * *